Feb. 23, 1971  W. J. DE GAIN  3,564,688
METHOD FOR FORMING A SHOCK ABSORBING STRUCTURAL MEMBER
Original Filed July 14, 1966  3 Sheets-Sheet 1
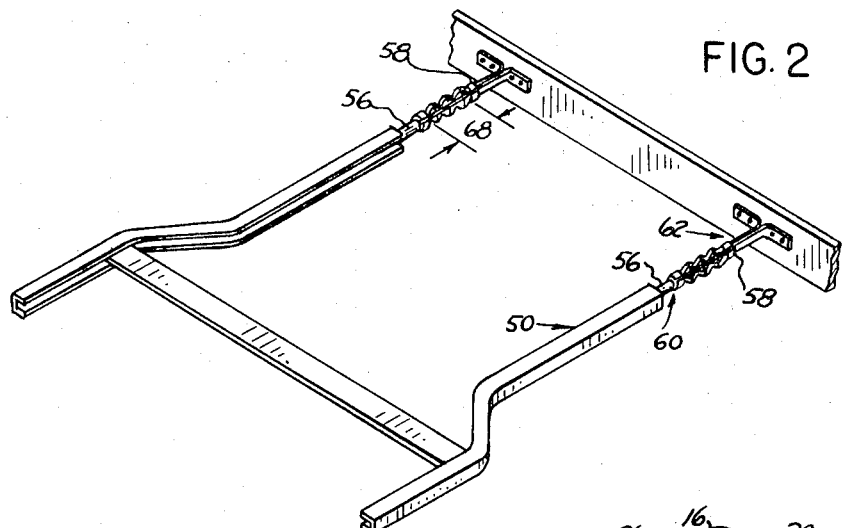
FIG. 2
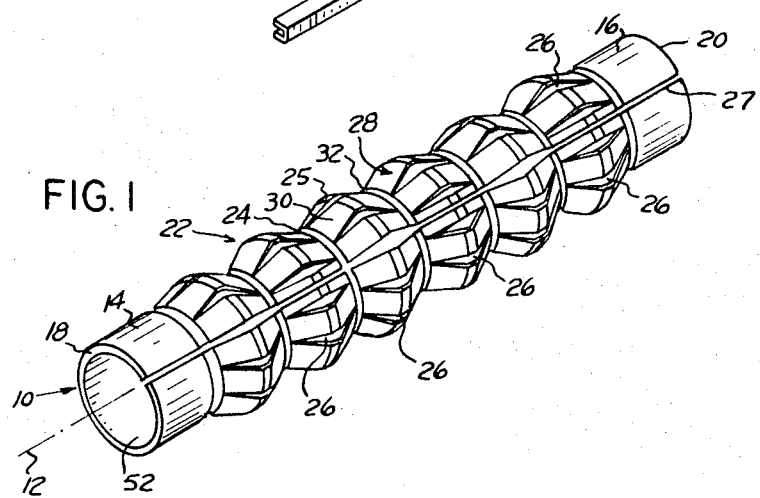
FIG. 1
FIG. 10
FIG. 11
INVENTOR
WILLIAM J. DeGAIN
BY Hauke, Krass, Gifford, & Patalidis
ATTORNEYS Feb. 23, 1971 W. J. DE GAIN 3,564,688
METHOD FOR FORMING A SHOCK ABSORBING STRUCTURAL MEMBER
Original Filed July 14, 1966 3 Sheets-Sheet 3

INVENTOR
WILLIAM J. DEGAIN

BY Hauke, Krass, Gifford, & Patalidis

ATTORNEYS

United States Patent Office 3,564,688
Patented Feb. 23, 1971

3,564,688
METHOD FOR FORMING A SHOCK ABSORBING STRUCTURAL MEMBER
William J. De Gain, Detroit, Mich., assignor, by mesne assignments, to Koppy Tool Corporation, Ferndale, Mich., a corporation of Michigan
Original application July 14, 1966, Ser. No. 565,223, now Patent No. 3,412,628, dated Nov. 26, 1968. Divided and this application June 7, 1968, Ser. No. 735,434
Int. Cl. B23p 17/00
U.S. Cl. 29—155                                    11 Claims

ABSTRACT OF THE DISCLOSURE

A method for forming a structural member which is adapted to remain rigid when subjected to forces below a predetermined magnitude and to collapse and absorb energy when forces in excess of the predetermined magnitude are imposed on it. The method includes forming sheet steel into an elongated tubular configuration, forming a series of regularly spaced circumferential grooves of reduced thickness along the length of the tube, forming longitudinal slits or cut-outs in the tube, and then outwardly expanding the tube at alternate pairs of grooves so that alternate tube sections are expanded to a larger diameter than intermediate tube sections. Alternatively, the tube may be expanded at each third groove, with intermediate tube sections retaining their original shape.

CROSS-REFERENCE TO RELATED APPLICATION

The present invention is a divisional application of U.S. Ser. No. 565,223, filed July 14, 1966, and issued Nov. 26, 1968 as Pat. No. 3,412,628.

BACKGROUND OF THE INVENTION

(I) Field of the invention

This invention relates to a method of forming a shock absorbing member that structurally supports a substantial predetermined load and collapses to a predictable configuration when overloaded.

SUMMARY OF THE INVENTION

The present invention provides a method of forming a structural stress carrying element for a vehicle or the like and which is designed to rigidly support a predetermined load prior to impact or collision of the vehicle, and after such impact, foreshorten a predetermined distance in collapse.

It is an object then of this invention to provide a method of forming a structural load carrying element that carries a predetermined load prior to impact of collision, and collapses a considerable distance that is predetermined after such impact, and which is readily detechable and disposable after the collision.

It is a further object of this invention to provide a method of forming a structural stress carrying element which when used in the structure of a vehicle will carry a predetermined load prior to impact of collision, will collapse to a predictable length and configuration after collision, will limit the transmission of deceleration forces caused by collision during collapse, and which is readily detachable and disposable after collision, and yet is capable of being easily and inexpensively manufactured.

It is a still further object of this invention to provide an uncomplicated and inexpensive method of making a structural element that is capable of carrying a predetermined structural load prior to impact, that collapses to a predetermined configuration after the impact of collision, and is readily removable and disposable after collision.

These and other objects are accomplished by forming a tubular structure with circumferentially aligned depressed grooves at uniform intervals on its exterior surface. Longitudinal openings are formed between certain of these grooves and across others. Every other groove is expanded outwardly from a central axis of the tubular structure. This expansion forms barrel-like portions that render a predetermined configuration of collapse of the tube when a sufficient axially directed load is applied to the tube. Alternatively, longitudinal openings may be formed across every third groove and every third groove expanded outwardly from the central axis of the tubular structure to form an accordian like tube. The grooves provide a precisely predetermined minimum thickness of the tubular structure. This predetermined minimum thickness together with the precise pattern and initial collapse configuration provide both the load carrying capabilities and predictable collapse configuration of the structural element.

DESCRIPTION OF THE DRAWINGS

Other objects of this invention will appear in the following description and appended claims, referring to the accompanying drawing forming a part of the specification.

FIG. 1 is a perspective view of a structural member formed by a preferred method of this invention;

FIG. 2 is a perspective view of the member shown in FIG. 1 being employed in the structure of an automobile to provide support for bumpers;

FIG. 10 is a perspective view of a tubular member formed by still another method of the invention; and FIG. 11 is a partial sectional view taken along line 11—11 of FIG. 10.

DESCRIPTION OF SEVERAL PREFERRED METHODS OF THE PRESENT INVENTION

Figure 3:
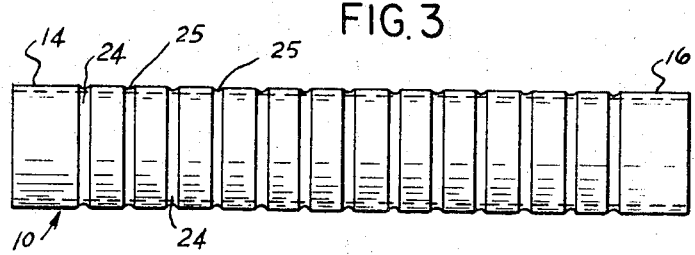
FIG. 3 is a longitudinal view of a tubular member after one step of the method of this invention.

Before explaining the method of the present invention in detail, it is to be understood that the invention is not limited in its application as to the forming of members with the details of construction and arrangement of parts illustrated in the accompanying drawings since the invention is capable of other embodiments and of being practiced or carried out in various ways. Also, it is to be understood that the phraseology and terminology employed herein is for the purpose of description and not of limitation.

In FIG. 1 there is shown a cylindrical steel tubular member 10 formed by a preferred method of this invention. The tubular member 10 has a central axis 12 extending longitudinally through the length of the member. Smooth right circular cylindrical portions 14 and 16 are located near ends 18 and 20, respectively, of the member 10. In between portions 14 and 16 are a plurality of outwardly bulging accordian-like or barrel-like portions 22. Each of these barrel-like portions 22 is bordered by annularly depressed grooves 24 peripherally or circumferentially formed by any means such as impressing on or cutting into the tubular member 10. Intermediate each of these grooves 24 and coextensive with the radially outwardmost portion of the barrel-like portions 22 are annularly depressed grooves 25 likewise circumferentially formed by any means such as impressing on or cutting into the tubular member 10. It is apparent that the grooves 24 and 25 can be found in any convenient manner which will reduce the thickness in these areas such as by impressing or by actually removing metal in these areas.

Each of the barrel-like portions 22 comprises bracket-like elements 28 disposed between pairs of slits 26 and the grooves 24. The grooves 25 are located at L-shaped junctions of portions 30 and 32 of the hinge-like or bracket-like members 28. In the preferred embodiment of this invention the portions 30 and 32 are raised at angles of approximately 25 degrees with respect to the central axis 12 of the cylindrical tubular member 10.

A longitudinal slot or aperture 27 (FIG. 1) extending throughout the length of the tube 10 facilitates removal of the tube from the supported structure after the tube collapses.

Referring again to FIG. 2, there is shown an installation of the tubular member 10 into an automotive structure 50. The interior cylindrical surface 52 and 54 (FIG. 5) near ends 18 and 20, respectively, elastically grip mating outer cylindrical surfaces 56 and 58, respectively, on structural extension members 60 and 62, respectively, of the automotive structure 50. Collars (not shown) on the extension members 60 and 62, respectively, rigidly confine the tubular member 10 within a predetermined distance between the extension members 60, 62. When the tubular member 10 collapses, members 62 and 60 come closer together by a distance 68 corresponding substantially to the combined length of the barrel-like portions 22 on the tubular member 10.

During the normal operation of an automobile in which the present invention is employed, the tubular member absorbs a portion of the structural load imposed on the automobile. For example, when the tubular member 10 is utilized to provide support for bumpers on an automobile as shown in FIG. 2, the load imposed on the tubular members by the weight of the bumpers is not sufficient to cause significant extension or collapse of the tubular member 10. Even loads imposed on the bumper due to "gentle" nudging during parking, or during the pulling of trailers, will not cause undue extension or collapse of the tubular members 10.

However, when a load is imposed beyond a predetermined limit, collapse of these members will occur in a direction along longitudinal axis 12. The barrel-like portions 22 will bend out further so that the grooves 24 will come toward each other and portions 14 and 16 of the tubular member will move toward each other and be separated by a distance substantially less than that prior to collision. The grooves 25 at the outer extremity of the barrel-like portions 22 will extend further outwardly as the tubular member collapses, but not beyond a distance indicated by the length of portions 30 and 32 of the bracket-like portions. In this manner, a predictable configuration of collapse is achieved.

When collapsed, the barrel-like portions of the tubular member 10 are bent outwardly, so that bracket portions 30 and 32 are close to being parallel. This results in a configuration in which the barrel-like portions fold together like an accordian, thus reducing the distance between the cylindrical end portions 14 and 16 by an amount substantially equal to the length of the barrel-like portions prior to collapse. The reduction of distance is especially valuable in preventing the steering wheel shaft from injuring the driver when the present invention is employed in the steering wheel shaft and enclosures assembly of an automobile rather than the bumper supporting structure as discussed above. Also when collapsed the slot 27 is widened to facilitate removal of the collapsed tube.

Figure 7:
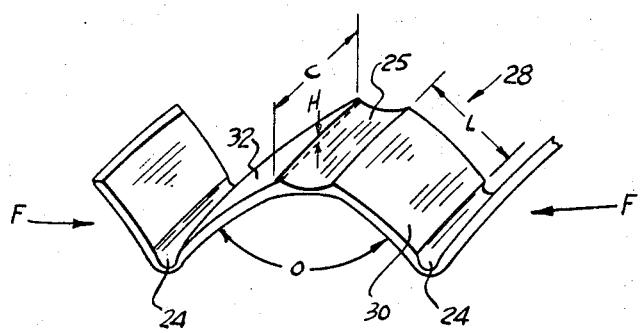
FIG. 7 is a partial sectional view of a portion of the member shown in FIG. 1.
Figure 8:
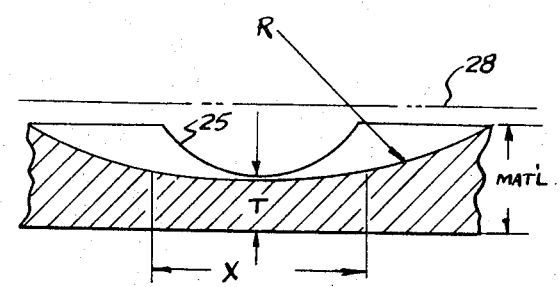
FIG. 8 is a diagrammatic view illustrating a portion of the member shown in FIG. 7.

Referring to FIG. 7, there is shown one of the bracket or hinge-like elements 28 of the barrel-shaped portions of a preferred embodiment of the structural member formed in accordance with the method of this invention. In FIG. 8 there is shown a diagrammatically fragmentary cross-section of the hinge-like element 28 at the groove 25 joining the portions 30 and 32. As shown in FIG. 8, the groove 25 may be formed with a small radius as indicated at 25 or, alternatively, with a larger radius as indicated by the letter R. The letter L refers to the length of the portions 30, 32. The letter $\theta$ indicates the angle between the portions 30, 32. The letter T refers to the minimum thickness of the common groove 25 between the portions 30, 32. The letter R refers to the radius of curvature of the common groove 25. The letter X refers to the width of the groove 25 having a thickness substantially equal to the minimum thickness T. As shown in FIG. 8, X refers to a groove 25 having a radius R. X also corresponds to the length of the useful beam segment parallel to the direction of force applied to the tubular member 10. The letter C refers to the chord length of arcuate portions 30, 32 of the hinge-like element 28 in the preferred embodiment of the tubular member 10. The chord length corresponds to the width of the portions 30, 32. The letter H refers to the length of the arc displacement from corresponding point on the chord of the portions 30, 32 of the hinge-like element 28.

The strength of the hinge-like elements 28 is a function of the parameters referred to in the above paragraph. Generally, the greater angle $\theta$, the thickness T, the maximum arcuate displacement H, the length of the chord C, the lesser the radius distance R, and the lesser the length L, the greater will be the force F which the hinge-like elements 28 can support before collapse. A member with hinge-like elements 28 indicated in FIGS. 7 and 8 can be impressed or have material removed to produce a constant material thickness T at groove 25 in combination with segments having the length L and formed to an angle $\theta$ arranged to collapse in a hinge-like motion with a predetermined force along the lines of action indicated by vectors F. The combination of the radius R and wall thickness T determines the cross-sectional strength of the hingle-like portion 28 at the groove 25. The angle $\theta$ will determine the proportion of the structural load carried by the portions 30, 32 indicated by the length L as components of such load carrying capacity in the direction of the force along the lines of action indicated by the vectors F. The greater the height H of the zenith of the arc over the corresponding chord the greater will be the structural load carrying capacity. By controlling each of the above discussed parameters, a precise determination of the structural load carrying capacity of the hinge-like elements 28 and hence tubular member 10 of which the hinge-like elements 28 are a part, as well as the force which will produce axial collapsing, can be precisely predicted.

Figure 9:
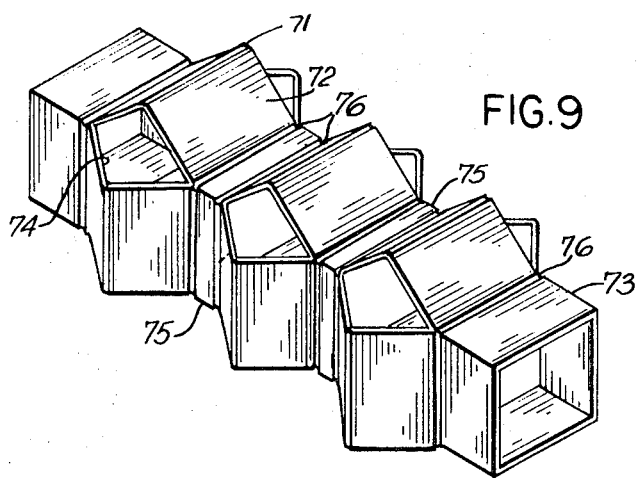
FIG. 9 is a perspective view of a tubular member formed by an alternate method of this invention.

Referring to FIG. 9 there is shown an alternative embodiment of a tubular member used in the practice of this invention. The polygonal shaped tube 73 is provided with a plurality of slits 74 formed along its edges and separated by unslit portions 75. The portions of the tube 73 adjacent the slits 74 are expanded outward to form hinge-like portions 72 having circumferential grooves 71 formed on their outer edge and grooves 76 formed at their base edges. The portions of the tube 73 adjacent the unslit portions 75 form a smaller cross-section between the portions 72. The unslit portions 75 are necessary to prevent the slits 74 from running together. Thus, the tube 73 is formed with alternate sections of increased cross-section formed by the hinge-like portions 72 separated by portions of smaller cross-section. At the grooves, areas of minimum thickness are precisely determined in a manner analogous to that of the cylindrical tube. The tubular member is formed into accordion-like or barrel-like portions to form a predetermined pattern, which together with the predetermined areas of minimum thickness provide a predictable collapsed configuration at a predetermined load.

In addition to the alternative embodiment shown of accordion-like configuration (FIG. 9) as well as the preferred cylindrical barrel-like configuration (FIG. 1), a variety of other shapes of tubes can be formed into accordion-like configurations having predetermined areas of minimum thickness. These alternative embodiments, as well as the preferred embodiment, can, by the practice of this invention, provide structural load carrying capacity up to a predetermined limit and a predictable collapsed configuration when loads are imposed beyond that limit.

Figure 4:
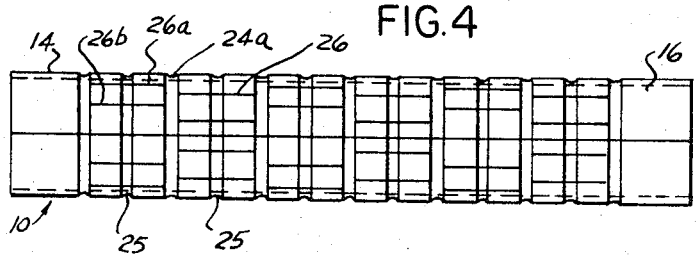
FIG. 4 is a longitudinal view of the tubular member of FIG. 3 after a successive step in the method of this invention.
Figure 5:
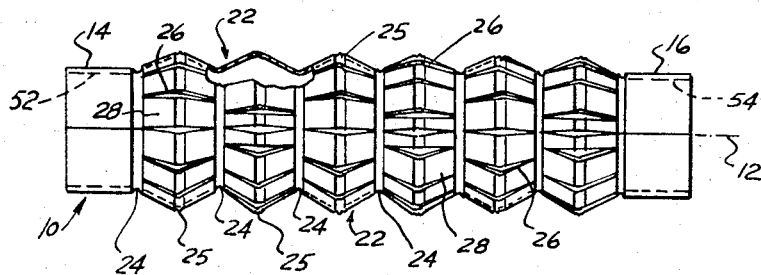
FIG. 5 is a longitudinal view of the tubular member of FIG. 4 after a further successive step in the method of this invention.
Figure 6:
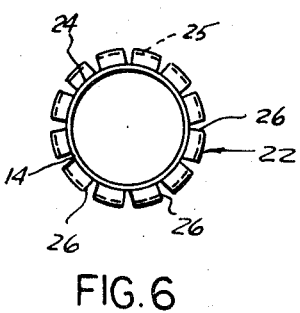
FIG. 6 is a cross-sectional view of the member shown in FIG. 5.

FIGS. 3, 4 and 5 illustrate successive steps in a preferred method of making a tubular member of the types above disclosed. The first step includes insertion of a mandrel (not shown) inside a circular tube 10. A suitable tool (not shown) is spaced at predetermined uniform intervals along the exterior surface of the tubular member 10 to form the annular grooves 24, 25 in the tube by any means such as by impressing or by removing metal. This results in a predetermined thickness within close tolerances in the annular grooves 24, 25 or depressions in the tubes. It is clear that this step can if desired be replaced by a cutting step which removes metal in these areas to reduce thickness and to form the grooves 24, 25.

FIG. 4 illustrates the tube 10 after the slits 26 have been punched at uniform circumferentially spaced intervals between the annular grooves or depressions 24, 25. The slits 26 are preferably formed by lancing the tube 10 against a mandrel (not shown) used as a die. As shown, slits 26A and 26B extending from the annular groove 24A are spaced away from the slit 26 on the other side of a groove 24A. By this design, an accidental extending of the slit beyond the annular groove 24A will not connect with another slit bordering on it. This insures a controlled load carrying capability in the tubular member 10.

As shown in FIG. 5 successive annular grooves 25 are pushed outwardly by an arbor (not shown) or other appropriate tool. They are spaced between annular grooves 24 so as to form the series of barrel-like extending portions 22, between the untreated exterior cylindrical surfaces 14 and 16 respectively of the tubular member.

After the barrel-like portions 22 are formed, the tube is heat treated to desirable stress characteristics. Preferably, annealing and sizing are performed in order to precisely calibrate longitudinal axis direction stress to a predetermined lower limit before the barrel-like portions of the tube will collapse.

FIGS. 10 and 11 illustrate another shock absorbing structural member constructed in accordance with the method of the present invention and consisting of a tube generally indicated at 90 having an end fitting 92 and a collapsible section generally indicated at 94 formed of a perforated metal. The collapsible section has diamond shaped cut-outs 96, replacing the slits of the previous embodiment and leaving relatively thin ribs 98. At regular intervals circumferential grooves 100 are formed about the tube by any means such as impressing them thereon or removing material. Bends are formed at these grooves 100 so as to corrugate the tube and raise sections alternate of the grooves to a greater diameter than the central diameter of the tube. Since the metal adjacent the grooves 100 is of a known thickness, and the tube is afterward annealed to produce a known metallurgy, the collapse strength of the tube may be easily calculated. The tube collapses into a known configuration so that the rate of collapse and of energy absorption for a given impact may be easily calculated.

From the above specification, it can be appreciated that an uncomplicated, inexpensive method has been provided for making an article that can be used as a structural element in carrying a predetermined load in an automobile prior to collision, and reducing the force of impact subsequent to collision by collapsing to a predetermined configuration along a longitudinal direction, and that can be readily disposed of after collision and replaced by similar inexpensive embodiment of this invention.

What is claimed is:

1. The method of making a member adapted to transmit loads imposed upon it which are below a predetermined level and to collapse in a uniform manner and absorb energy when a load in excess of said predetermined level is imposed upon it, comprising:
   forming fully circumferentially extending grooves of a reduced thickness in an elongated metal tube of a normal thickness;
   forming slits across at least certain of said grooves; and
   expanding said tube radially outward at the grooves across which slits are formed.

2. The method as defined in claim 1 and including the steps of annealing said tube to produce a known metallurgy whereby the collapse strength of said tube may be calculated.

3. The method as defined in claim 1 and in which the slits are formed across alternate of said grooves.

4. The method as defined in claim 1 and including the step of forming a slit in said tube extending from one end to the other.

5. The method as defined in claim 1 and in which the slits of one of said grooves are circumferentially offset from the next set of said slits.

6. The method of making a member adapted to transmit loads imposed upon it which are below a predetermined level and to collapse in a uniform manner and absorb energy when a load in excess of said predetermined level is imposed upon it, comprising:
   forming fully circumferentially extending rings of a reduced thickness in an elongated metal tube of a normal thickness;
   forming perforations in said tube for a length thereof extending past at least a pair of said rings; and
   expanding said tube outwardly at alternate rings.

7. The method as defined in claim 6 and including the step of annealing said tube to produce a known metallurgy whereby the collapse strength of said tube may be calculated.

8. The method of making a member adapted to transmit loads imposed upon it which are below a predetermined level and to collapse in a uniform manner and absorb energy when a load in excess of said predetermined level is imposed upon it, comprising;
   forming fully perimetrically extending grooves of a reduced thickness in an elongated metal tube of normal thickness; and
   expanding the tube outwardly at alternate grooves to form alternate sections of increased cross-section defined by alternate grooves at the areas of minimum cross-section and an intermediate groove at the area of maximum cross-section.

9. The method as defined in claim 8 and including the step of cutting said tube longitudinally and through said sections of increased cross-section.

10. The method as defined in claim 8 and including the step of annealing said tube to produce a known metallurgy whereby the collapse strength of said tube may be calculated.

11. The method as defined in claim 1 and in which the slits are formed across every third one of said grooves along longitudinally extending bends formed in said tubes.

References Cited

UNITED STATES PATENTS

| | | | |
|---|---|---|---|
| 1,215,061 | 2/1917 | Rice et al. | 29—155 |
| 3,167,851 | 2/1965 | Cowan | 29—155 |
| 3,412,628 | 11/1968 | De Gain | 74—492 |

THOMAS H. EAGER, Primary Examiner

U.S. Cl. X.R.

29—413; 74—492

UNITED STATES PATENT OFFICE
CERTIFICATE OF CORRECTION

Patent No. 3,564,688                    Dated February 23, 1971

Inventor(s) William J. DeGain           (KTD-103-A-1)

It is certified that error appears in the above-identified paten and that said Letters Patent are hereby corrected as shown below:

IN THE SPECIFICATION:

Column 1, line 57, change "detechable" to --detachable-

Column 3,
      line 40, change "surface" to --surfaces--

Column 4, line 10, change "The" to --This--
      line 70, after "hence" insert --of the--

IN THE CLAIMS:

Column 6, line 36, change "steps" to --step--

Signed and sealed this 17th day of August 1971.

(SEAL)
Attest:

EDWARD M. FLETCHER, JR.                 WILLIAM E. SCHUYLER, JI
Attesting Officer                       Commissioner of Patents